United States Patent [19]

Guillemaud et al.

[11] Patent Number: 5,930,384
[45] Date of Patent: Jul. 27, 1999

[54] PROCESS FOR THE RECONSTRUCTION OF A 3D IMAGE WITH CONTRAST AND RESOLUTION IMPROVEMENTS AND APPLICATION OF SAID PROCESS TO THE PRODUCTION OF AN ATTENTUATION CARTOGRAPHY OF AN OBJECT

[76] Inventors: Régis Guillemaud, 15, Boulevard Maréchal leclerc; Etienne Payot, 3, Quai Claude Bernard, both of Grenoble 38000; Yves Trousset, 8, Résidence du Parc, Palaiseau 91120; Francoise Preteux, 1, Quai d'Austerlitz, 75013 Paris, all of France

[21] Appl. No.: 08/793,699
[22] PCT Filed: Jul. 2, 1996
[86] PCT No.: PCT/FR96/01026
  § 371 Date: Aug. 21, 1997
  § 102(e) Date: Aug. 21, 1997
[87] PCT Pub. No.: WO97/02545
  PCT Pub. Date: Jan. 23, 1997

[30] Foreign Application Priority Data

Jul. 3, 1995 [FR] France ................................ 9508002

[51] Int. Cl.⁶ ................................ G06K 9/00; A61B 6/00
[52] U.S. Cl. .................... 382/154; 382/131; 345/419; 250/363.04; 378/4; 600/425
[58] Field of Search .................... 382/128, 131, 382/154; 345/419, 420, 424, 427; 250/363.04; 378/4, 901; 600/425

[56] References Cited

U.S. PATENT DOCUMENTS

| | | | |
|---|---|---|---|
| 4,095,107 | 6/1978 | Genna et al. | 250/363.04 |
| 4,769,756 | 9/1988 | Webber et al. | 382/174 |
| 5,321,612 | 6/1994 | Stewart | 702/13 |
| 5,390,291 | 2/1995 | Ohashi | 345/419 |
| 5,400,255 | 3/1995 | Hu | 378/901 |
| 5,408,511 | 4/1995 | Grangeat et al. | 378/19 |
| 5,430,783 | 7/1995 | Hu et al. | 378/4 |
| 5,475,726 | 12/1995 | Azevedo et al. | 378/4 |
| 5,559,335 | 9/1996 | Zeng et al. | 250/363.04 |
| 5,560,360 | 10/1996 | Filler et al. | 600/408 |
| 5,661,773 | 8/1997 | Swerdloff et al. | 378/65 |

OTHER PUBLICATIONS

R.J. Michellena, "Singular–Value Decomposition for Cross–Well Tomography," *Geophysics* —vol. 58(11) pp. 1655–1661 (1993).

Xu, et al., "Iterative Algebraic Reconstruction Algorithms for Emission Computed Tomogrpahy: A Unified Framework and its Application to Position Emission Tomography," *Medical Physics*—vol. 20(6), pp. 1675–1684 (1993).

Johnson, et al., "A Computer Model for the Study of Electrical Current Flow in the Human Thorax," *Computers in Biology and Medicine*—vol. 22(5), pp. 305–323 (1992).

(List continued on next page.)

*Primary Examiner*—Jon Chang
*Assistant Examiner*—Mehrdad Dastouri
*Attorney, Agent, or Firm*—Burns, Doane, Swecker & Mathis LLP

[57] ABSTRACT

A three-dimensional image of an object is constructed by a process using values assumed by a property of the object in an array of elementary volumes of the object. The process determines the measured projections of the property and reconstructs the three-dimensional image of the object by iteration. The iteration includes steps of carrying out a reconstruction of a first three dimensional image of the object, estimating local parameters defining an anisotropic model of the object as a function of the reconstructed three-dimensional image, deducing calculated projections of the property passing through at least one elementary volume, comparing at least one calculated projection with the measured projection in order to deduce therefrom a projection difference, determining a weighting factor, and performing an updating of each elementary volume.

5 Claims, 1 Drawing Sheet

OTHER PUBLICATIONS

Brandenburger, et al., "Effects of Anisotropy in the Ultrasonic Attenuation of Tissue on Computed Tomography," *Ultrasonic Imaging*—vol. 3(2), pp. 113–143 (1981).

Kudo, et al., "Feasible Cone Beam Scanning Methods For Exact Reconstruction in Three–Dimensional Tomography", *Optical Society of America*—vol. 7, No. 12, pp. 2169–2183 (Dec. 1990).

Feldkamp, et al., "Practical Cone–Beam Algorithm", *Optical Society of America*—vol. 1, No. 6, pp. 612–619 (Jun. 1984).

Kudo, et al., "Feasible Cone Beam Scanning Methods For Exact 3–D Tomographic Image Reconstruction", *Prac. Topical Meeting OSA, Signal Recovery and Synthesis Cape Code, USA*—pp. 174–177 (Jun. 1989).

Geman, et al., "A Comprehensive Statistical Model for Single–Photon Emission Tomography", *Markow Random Fields*—pp. 93–130 (1993).

Luo, et al., "Local Gemometry Variable Conductance Diffusion for Post–Reconstruction Filtering", *IEEE Transactions on Nuclear Science*—vol. 41, No. 6, pp. 2800–2806 (Dec. 1994).

Medoff, et al., "Iterative Convolution Backprojection Algorithms for Image Reconstruction from Limited Data", *Optical Society of America*—vol. 73, No. 11, pp. 1493–1500 (Nov. 1983).

Herman, et al., "Mathematical Methods in Tomography", *Proceedings of a Conference Held in Oberwolfach, Germany*—pp. 66–97 (Jun. 1990).

Payot, et al., "An Adaptive and Constrained Model for 3D X–Ray Vascular Reconstruction" Publication reference and date are not indicated.

Perona, et al., "Scale–Space and Edge Detection using Anisotropic Diffusion", *IEEE Transactions on Pattern Analysis and Machine Intelligence*, vol. 12, No. 7, pp. 629–639 (Jul. 1990).

Sauer, et al., "Bayesian Estimation of 3–D Objects from Few Radiographs", *IEEE Transactions on Nuclear Science*, vol. 41, No. 5, pp. 1780–1790 (Oct. 1994).

Smith, "Image Reconstruction from Cone–Beam Projections: Necessary and Sufficient Conditions and Reconstruction Methods", *IEEE Transactions on Medical Imaging*—vol. MI–4, No. 1, pp. 14–24 (Mar. 1985).

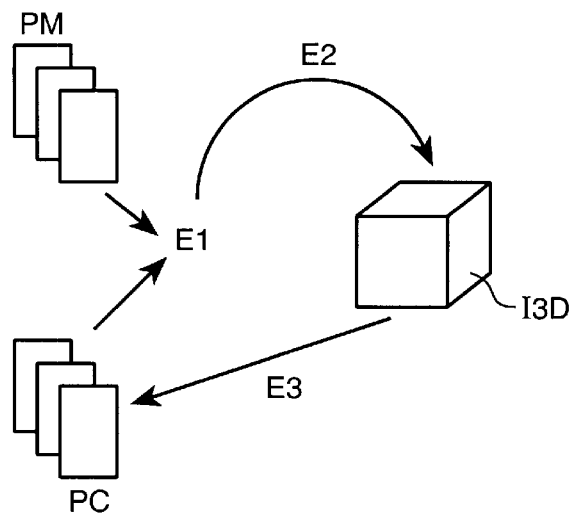
FIG._1
(PRIOR ART)
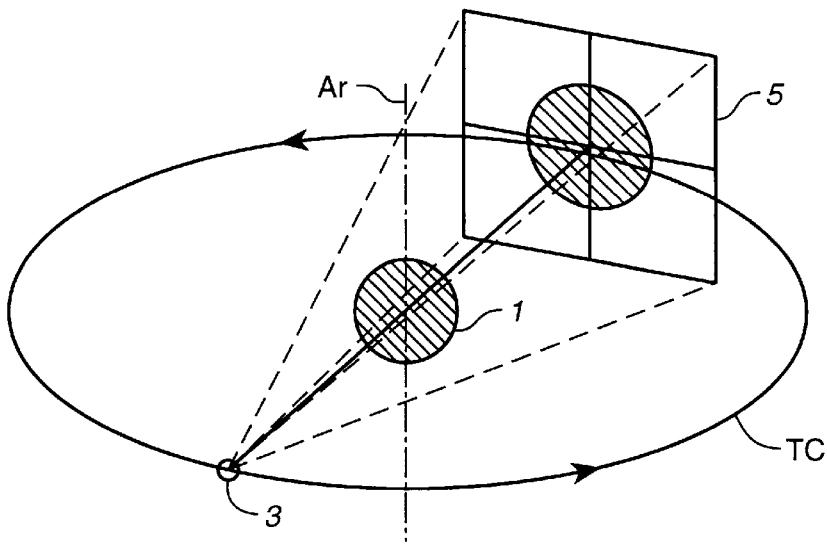
FIG._2
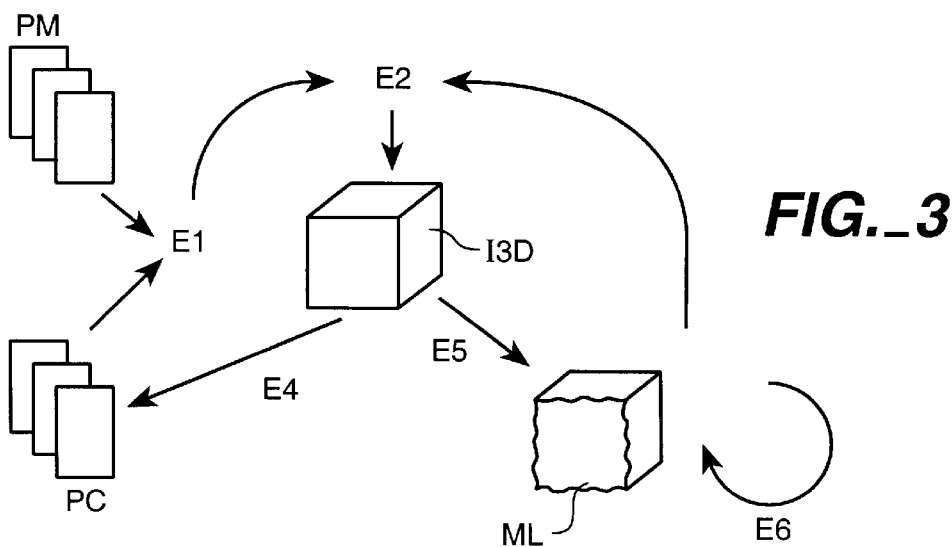
FIG._3

PROCESS FOR THE RECONSTRUCTION OF A 3D IMAGE WITH CONTRAST AND RESOLUTION IMPROVEMENTS AND APPLICATION OF SAID PROCESS TO THE PRODUCTION OF AN ATTENTUATION CARTOGRAPHY OF AN OBJECT

DESCRIPTION

1. Field of the Invention

The invention relates to a process for the reconstruction of a good resolution, contrasted, three-dimensional image of an object defined by values assumed by a property in an array of elementary volumes of the 3D image of the object.

The invention also relates to an application of this process to the production of an attenuation cartography or mapping of the object, the property of the object then being the attenuation of radiation by said object.

The invention has numerous applications in the field of imaging and in particular medical imaging, especially for the study of the vascular tree in X imaging on the basis of an attenuation cartography of said vascular tree.

2. Prior Art

In the field of three-dimensional (3D) reconstruction of images, the expert frequently uses algebraic or analytical resolution methods.

Among the analytical methods, the most frequently used algorithm is the filtering/reprojection algorithm described by NATERRER in "The mathematics of computerized tomography", J. WILEY and Sons, 1986. This algorithm is also considered to be the reference algorithm in this field.

In an application to attenuation cartography to be described in greater detail hereinafter, said algorithm is essentially used when the chosen acquisition geometry is a parallel or fan-type geometry.

However, for a cone-beam acquisition geometry, it is e.g. possible to use:

- the direct analytical algorithm by filtering and back projection in cone-beam geometry described by FELKAMP C. A. et al in "Practical cone-beam algorithm", 1984, J. Opt. Soc. Am.;
- the direct analytical algorithm by rearrangement in the Radon region via the HILBERT transform of the primary derivative of the Radon transform, described by SMITH B. D. in "Image reconstruction from cone-beam projections : necessary and sufficient conditions and reconstruction methods", 1985, IEEE Trans. on Med. Imag. and by KUDO H., SAITO T. in "3D tomographic image reconstruction from incomplete cone-beam projections", Proc. Topical Meeting OSA, Signal Recovery and Synthesis, Cape Code (USA), 1989;
- the direct analytical algorithm by rearrangement in the Radon region via the primary derivative of the Radon transform, described by GRANGEAT in "Analysis of a 3D imaging system by reconstruction on the basis of X-radiography in cone-beam geometry", 1987, PhD thesis submitted to the Ecole Nationale Superieure des Telecommunications (Paris) and also described in European patent application EP-A-29240.

Although these algorithms permit a rapid processing, they suffer from the major disadvantage of being unusable when the acquisition conditions are difficult, i.e. for example in cases where the angular discretization of the acquisition is not regular or when the angular sector or number of projections is very small or in the case where the acquisition geometry is not stable, which creates fuzzy measurements.

Algebraic methods generally use measured projections of the property of the object and then, on the basis of these measured projections, reconstruct a first 3D image of the object. It is then possible to deduce said first 3D image from the projections (called calculated projections of the object), which are compared with real projections of the object. The result of this comparison between the real projections and the calculated projections makes it possible to update the reconstructed 3D image. On the basis of this new 3D image, new calculated projections are deduced and are again compared with the real projections. The process continues in iterative manner until a satisfactory 3D image is obtained.

For a better general understanding of this known algebraic reconstruction process, reference can be made to FIG. 1 showing a general diagram for the reconstruction of a 3D image by a conventional algebraic method.

In FIG. 1, PM refers to the real projections determined for the studied property and PC designates the projections calculated on the basis of the reconstructed 3D image. The reconstructed 3D image is called I3D. Moreover, E1 is the stage of comparing the real projections with the calculated projections, E2 the stage of updating the 3D image and E3 the reprojection stage for deducing new calculated projections.

Thus, such an algebraic method is iterative and is based on the one hand on a description of the relation linking the 3D image to be reconstructed with data measured by a linear equation system $Y=A*X$ (in which $*$ is a vector matrix multiplication) and on the other on the resolution of this linear equation system by an iterative method. A method of this type is explained e.g. by GULLBERG et al in the document "An iterative reconstruction algorithm for single photon emission computed tomography with cone-beam geometry", 1989, Int. J. of Imag. Sys. and Techn. 1, 169–186.

In particular, these iterative methods can be used for producing object radiation attenuation or emission cartographies.

In this case, e.g. of an attenuation cartography, the process for reconstructing the 3D image of an object can be implemented after real attenuation projections have been determined. They are determined on the basis of emission measurements performed by means of a 3D tomographic system like that shown in FIG. 2.

This tomographic system comprises a radiation source 3 able to emit photons towards the object 1 to be studied and a detection means 5 arranged symmetrically to the source 3 relative to the object. This detection means 5 can be a radiological image amplifier provided with several detectors. In the application shown in FIG. 2, the radiation source 3 is an X-ray emitting tube.

This radiation source 3 is able to assume several positions relative to the object 1 and which are located on an e.g. circular trajectory Tc. The trajectory Tc is located in a transaxial plane, which is the plane perpendicular to the rotation axis Ar. The detection means is then subject to essentially the same rotary movements as the radiation source 3 on the trajectory Tc.

In FIG. 2 the rotation axis Ar passes through the centre of the object 2, but can also be offcentred with respect to said object 2.

For an application to cartography or mapping, as a result of said device it is possible to carry out measurements in transmission, i.e. it is possible to measure on the detector, the number of photons which have reached the detector following the attenuation created by the object. On the basis of these measurements in transmission, it is possible to determine attenuation projections, which are in fact the total attenuation by the object along a chosen line. Thus, the said attenuation projection is the integral of the local attenuation measurement along the projection line.

More specifically, in the case of vascular imaging, the attenuation projection measurement initially takes place by carrying out a first reference transmission acquisition without any contrast medium being injected into the patient. This first reference acquisition is designated No. Several different transmission acquisitions then take place with an injection of contrast medium, in accordance with the different directions around the studied object. These transmission acquisitions are designated N. For each pixel of the detector, each of these acquisitions contains the number of photons emitted by the source and which have not been attenuated by the object. It is then possible to determine the projection of the attenuation difference $X_\mu$ before and during the contrast medium injection on the basis of the following formula:

$$\frac{N}{No} = e^{-X_\mu}$$

$X_\mu$ being the measured projection.

In order to carry out a 3D image reconstruction process by an algebraic method, within the framework of an application to attenuation cartography, it is possible to use several different types of algorithms, such as those described by GEMAN et al. in "A comprehensive statistical model for Single Photon Emission Tomography", 1993, MARKOV Random Field, Academic Press Inc., and by SAUER et al. in "Bayesian estimation of 3D objects from few radiographs", 1994, IEEE Trans. on Nuclear Science, vol. 41.

However, although these algebraic methods can be relatively easily adapted to all acquisition geometries and can be performed for difficult acquisition conditions, they suffer from the disadvantage of requiring a relatively large number of calculations, so that the process is long and fastidious.

Moreover, in the case of difficult acquisition conditions (small number of viewpoints, limited angular sector, unstable acquisition geometry, etc.), said conventional algebraic reconstruction methods have great difficulty in supplying a result with an adequate quality to permit a correct and reliable reading of the cartography obtained. Thus, under such conditions, the images obtained very frequently lack contrast and their resolution is inadequate, so that it is difficult to read the image.

In order to improve the 3D image obtained, it is possible to perform subsequent reconstruction treatments such as e.g. a contour enhancing or segmentation. An iterative algorithm for improving the image having a base loop of two separate stages (reconstruction and subsequent treatment) is described by MEDOFF et al. in "Iterative convolution backprotection algorithms for image reconstruction from limited data", 1983, J. Opt. Soc. Am., vol. 73 and by DINTEN in "Tomography based on a limited number of projections : regularization by Markov fields, 1990, Paris University PhD thesis.

Another process for improving the 3D image to be obtained consists of introducing a previously defined model into the reconstruction algorithm. This process is described in its application to nuclear imaging TEMP (single photon emission tomography), e.g. by GEMAN et al. in "A comprehensive statistical model for single photon emission tomography", 1993, MARKOV Random Field, Academic Press Inc. and by SAUER et al. in "Bayesian estimation of 3D objects from few radiographs", 1994, IEEE Trans. on Nuclear Science, vol. 41.

However, none of these processes leads to sufficiently good resolution and contrast levels to permit, in the case of medical imaging, the obtaining of a cartography of a quality sufficient to enable a doctor to precisely study therein complex pathologies such as an aneurism or an arteriovenous defect.

DESCRIPTION OF THE INVENTION

The object of the invention is to obviate the disadvantages of the different processes described hereinbefore. To this end, it proposes a process for the reconstruction of a three-dimensional image using an anisotropic model and making it possible to obtain a good resolution, contrasted 3D image. The 3D image is constituted by the regular juxtaposing of contiguous elementary volumes.

With each elementary volume of the image of the object is associated a local model consisting of attributing to it parameters characterizing the object and in particular the direction of least variation of the property. The latter is only defined in a unique manner for objects having a highly anisotropic structure (e.g. the vascular network, fibres in a material, etc.).

More specifically, the invention relates to a process for the reconstruction of a three-dimensional image of an object, defined by values assumed by a property of the object in an array of elementary volumes of the 3D image of the object, consisting:

of determining on the basis of measurement acquisitions, by prior processing, measured projections of the property corresponding to measurements of sums of said property in accordance with lines localized by a bidimensional array associated with detection means, each acquisition being performed for a particular orientation of the detection means with respect to the object;

reconstructing the 3D image of the object by iteration;

characterized in that said reconstruction of the 3D image of the object consists:

a) on the basis of the measured projections, carrying out a reconstruction of a first 3D image of the object;

b) estimating, for each elementary volume, local parameters defining an anisotropic model using a direction of least variation of the property, as a function of said reconstructed 3D image; and for all the elementary volumes and all the measured projections:

c) on the basis of the reconstructed 3D image, deducing calculated projections of the property passing through at least one previously chosen elementary volume;

d) comparing at least one calculated projection with the measured projection corresponding to the same elementary volume in order to deduce therefrom a projection difference;

e) determining, for each elementary volume, a weighting factor as a function of the parameters of the anisotropic model, and values of the property on neighbouring elementary volumes of said chosen elementary volume; and f) carrying out an updating of each elementary volume, elementary volume by elementary volume, on the basis of the projection difference and a mean weighted by the weighting factor of the value of the property of the elementary volumes adjacent to the chosen elementary volume, in order to obtain a new 3D image of the object; then g) reiterating at least stages c) to f), taking as the reconstructed image the new 3D image, until the desired 3D image of the object is obtained.

Advantageously, each local model is anisotropic and locally defines a principal direction orthogonal to the gradient of the property of the respective elementary volume.

According to another embodiment of the invention, the process consists, prior to the reiteration of stage c), reestimating for each elementary volume the local parameters defining a new anisotropic model as a function of the last updating of the reconstructed 3D image of the property.

According to the invention, the process consists of carrying out a first smoothing in the direction of the anisotropic model, as a function of weighting factors determined in stage e) and, optionally carrying out one or more averaging operations (calculation of mean values) respectively in accordance with one or more directions transverse to the principal direction of the anisotropic model.

In the case of an application of the invention to the production of a cartography of the attenuation of radiation by the object, the property of the object is the attenuation of rays emitted by a radiation source towards the detection means, through said object, said source being able to assume several positions with respect to the object and the 3D image obtained is an attenuation cartography. In this case, the process firstly consists, for each position of the source, carrying out a transmission measurement acquisition of the rays by the object and on the basis of which a real projection of the attenuation is determined.

BRIEF DESCRIPTION OF THE DRAWINGS

FIG. 1, already described, shows a diagram for the reconstruction of the 3D image using a known algebraic method.

FIG. 2, already described, diagrammatically shows a 3D tomographic device making it possible to perform measurements of the attenuation or emission of an object.

FIG. 3 shows a diagram for the reconstruction of the 3D image according to the process of the invention.

DETAILED DESCRIPTION OF EMBODIMENTS

The invention relates to a process for reconstructing a three-dimensional image of an object defined by the values taken by a property of said object in a voxel array of said three-dimensional image of the object.

The process according to the invention firstly consists of determining measured projections of the property of the object, on the basis of measurements of sums of said property on localized lines by a bidimensional network associated with detection means.

It should be noted that each measurement of sums is performed for a particular orientation of the detection means with respect to the object, which means that each measurement is performed in a different direction from the other measurements during the same process.

On the basis of these measured projections of the property of the object, the process of the invention then consists of reconstructing a first three-dimensional (3D) image of the object, said first reconstruction being performed according to known procedures.

The process of the invention then consists of estimating, for each elementary volume, local parameters of an anisotropic model (described in greater detail hereinafter) containing at least the direction of least variation of the property of the estimated object as a function of the first reconstructed three-dimensional image.

Advantageously, the direction of least variation of the property $\theta_i$ is calculated according to one of the two following methods:

First method:

$\theta_i$ is estimated, for the elementary volume i, on the basis of the formula:

$$\theta_i = \text{ArgMin} \sum_{j \in V_{\theta_i}} |x_i - x_j|^2,$$

$$\theta \in \{\theta_i\}$$

in which $\{\theta_i\}$ is all the values which can be assumed by the direction of least variation, $V_{\theta i}$ is all the elementary volumes adjacent to the chosen elementary volume i, in the direction $\theta_i$, and where $x_i$ and $x_j$ are values of the property of the respective elementary volumes i and j.

Second method:

$\theta_i$ is considered as the direction of the proper vector associated with the minimum proper value of the inertia matrix of the gradient $M_i$, calculated in the vicinity of the elementary volume i and $$M_i = \sum_{j V_i} \langle \overline{V}x_j, \overline{V}x_j^T \rangle,$$

in which $V_i$ is all the elementary volumes adjacent to the chosen elementary volume i, $\overline{V}x_j$ is the gradient of the property corresponding to the elementary volume j and $\overline{V}x_j^T$ is the transpose of $\overline{V}x_j$.

On the basis of the reconstructed three-dimensional image, the process of the invention then consists of deducing a set of calculated projections of the property. These calculated projections correspond to sums of the property along measurement lines passing through at least one previously chosen elementary volume.

The process of the invention then consists of comparing, for each summation line passing through the elementary volume, each projection calculated with the measured projection corresponding to the same elementary volume, so as to deduce therefrom a projection difference on these lines.

The process then has a stage consisting of determining, for each elementary volume and as a function of local parameters of the chosen anisotropic model, a weighting factor determined on the basis of a weighted mean of the value of the property of the elementary volumes adjacent to the chosen elementary volume. This weighted mean is expressed by:

$$x_i \left(1 - \sum_{j \in V_i} \alpha_{ij}\right) + \sum_{j \in V_i} \alpha_{ij} x_j$$

with:

$$\alpha_{ij} = \frac{\alpha_{i \to j} + \alpha_{i \to j}}{2}$$

$$\alpha_{i \to j} = \begin{cases} 1 & \text{if } j \in V_{\theta_i} \\ e^{-\frac{|xi-xj|^2}{K^2}} & \text{if } j \in V_{\theta_i}{}^1 \\ 0 & \text{if not} \end{cases}$$

or

-continued $$\alpha_{i \to j} = \begin{cases} 1 & \text{if } j \in V_{\theta_i} \\ \dfrac{1}{1 + \left(\dfrac{|xi - xj|}{K}\right)^{\alpha}} & \text{if } j \in V_{\theta_i}^{1} \\ 0 & \text{if not} \end{cases}$$

in which:

$V_{\theta i}$ is the set of elementary volumes adjacent to the elementary volume i, in the direction $\theta_i$, $V_{\theta i}^{1}$ is the set of elementary volumes belonging to the plane transverse to the direction $\theta_i$ and adjacent to the elementary volume i, and K, α are previously fixed parameters.

Therefore this weighting factor is a weighted mean of the elementary volumes adjacent to the elementary volume being updated and involving the principal direction of the model.

The points of said mean are defined from the local model in question, in order to carry out a smoothing in the principal direction of the model and an enhancement of the contour in one or two directions tranverse to said principal direction. It should be noted that the smaller the gradient in the principal direction of the model, the greater the enhancement of the contour.

More specifically, the weights of said mean are defined on the basis of the local model in the following way:

for the central elementary volume, the weight is 1, in the principal direction defined by the model, the weights favour a smoothing of the object and the weight is then a constant (e.g. 1), in directions transverse to said principal direction and defined locally by the model, the weight can be zero or can be defined on the basis of a conductance function. This conductance function is a strictly decreasing function starting initially from 1 and converggin asymptotically towards 0 to infinity and with a single inflexion point, whose position is defined by the threshold of the gradient of the local model multiplied by the gradient in the principal direction of the model.

The weight of the adjacent elementary volume is then the value of said function taken for the abscissa "transverse gradient". The weight is zero for the neighbouring elementary volumes, not referred to hereinbefore.

The process then proposes carrying out an updating of each of the elementary volumes on the basis of the projection difference and the weighted mean determined in the preceding stages. This updating takes place for each individual elementary volume and on all the measured projections.

The process then consists of reiterating most of the preceding stages until the desired three-dimensional image of the object is obtained.

According to an embodiment the reiteration takes place on the basis of the calculation stage of the calculated projection.

According to another embodiment, reiteration takes place on the basis of the stage in which the local parameters of the anisotropic model of the object are estimated. Thus, the anisotropic model is reupdated for each iteration of the process in order to bring about a supplementary improvement to the model, so as to improve the definition of the three-dimensional image of the property finally obtained.

By means of a functional diagram, FIG. 3 shows the iterative processing of the three-dimensional image reconstruction process according to the invention.

As in FIG. 1, PM stands for the measured projections, PC the calculated projections and I3D the three-dimensional image of the object to be reconstructed. As in the process of FIG. 1, the real projections PM and calculated projection PC are compared during a comparison stage E1 and their difference (called "projection difference") is used for the updating E2 of the preceding three-dimensional image I3D, i.e. the 3D image reconstructed during the preceding iteration. The updating E2 of the image ID3 also takes account of the local parameters of the anisotropic model ML estimated during the preceding iteration.

According to the preferred embodiment of the invention shown in FIG. 3, these parameters of the anisotropic model ML are reupdated for each iteration of the process. This reupdating is represented by stage E5 showing, after each reupdating of the reconstructed three-dimensional image, that the local parameters of the anisotropic model ML are reupdated in order to be reused for the new updating performed during the following iteration of the process.

On the basis of the reconstructed, reupdated three-dimensional image I3D, new calculated projections PC are determined during the reprojection stage E4. This reproduction E4 takes place in parallel with the reestimating stage E5 of the local parameters of the anisotropic model ML.

FIG. 3 also shows the case in which there is a smoothing of the principal directions ML for each iteration. This regularization of the directions is represented by stage E6 and is expressed by the following formula:

$$\theta_i = \text{ArgMin}\left(\sum_{j \in V_i} x_j \sin^2(A_{ij})\right)$$

$$\theta_i \in \{\theta_i\}$$

in which:

$A_{ij}$ is the angle formed by the direction $\theta_i$ and $\theta_j$.

Thus, the process according to the invention consists of an algebraic reconstruction enriched by the use of local parameters of an anisotropic model estimated on the object being reconstructed and used for updating said reconstruction.

Such an anisotropic model locally defines the 3D least variation direction of the attenuation, which means that, in said direction, it filters the noise, whilst ensuring an enhancement of the contour of the image of the object in directions transverse to said least variation direction, which is known as the principal direction.

In parallel, said model consequently ensures a smoothing in the principal direction and an enhancement of the contours, which corresponds to averaging actions in directions transverse to the principal direction, which makes it possible to increase the contrast and definition of the 3D image finally obtained.

More specifically, this model is defined by:

a local (or principal) direction parameter estimated at each point of the reconstructed 3D image, one method for estimating said local direction is to seek the direction maximizing a local mean on a previously defined number of points (e.g. three points) in a set of discrete directions uniformly distributed in space;

a gradient measurement in said local direction and a gradient measurement in two transverse directions, the local gradient in one direction being estimatable on the basis of finite differences.

It can also be defined by a relevance parameter calculated at each point of the 3D image and which defines the relevance of the use of the chosen principal direction, i.e.

defining whether one is in a high attenuation zone corresponding to the object. This relevance parameter is in fact a weighting parameter used for defining, during updating, the influence of the effect of the local model with respect to the attachment of the real projections.

Apart from these so-called local parameters, the model is defined by a global parameter, namely a threshold on the gradient. This global parameter determines the effectiveness of the transverse enhancement based on the value of the gradient in the local direction.

The previously defined anisotropic model is thus locally estimated on the basis of an existing reconstructed image. For this purpose, it is necessary to have a first estimate of the three-dimensional image of the object, said image being obtained by a conventional, model-free reconstruction or by a reconstruction with an isotropic regularization constraint. This reconstruction of the three-dimensional image constitutes the first 3D image of the object.

Thus, a first local model can be estimated on the basis of said first 3D image. According to an embodiment, this model will be retained throughout the process, which means that the parameters defining the model will remain constant for the remainder of the process. According to another embodiment of the invention, the parameters defining the model will be reupdated during the different iterations.

The volume of 3D directions used in the model can also be regularized as the process progresses with a view to ensuring a continuity in the directions. This regularization can be performed by an algorithm of the ICM (iterated conditional mode) type, which minimizes the directional variations between two elementary volumes adjacent to the model volume. This regularization can be performed, e.g. for each complete updating of the directions used in the model, i.e. for each reiteration of the stage consisting of estimating the local parameters of the model. This ICM algorithm also has the characteristic of not being sensitive to the order of projections used and not having a tendency to reconstruct in a first phase the low frequencies and only then the high frequencies, unlike in certain algorithms, such as the gradient algorithm.

The use of an anisotropic model, as defined hereinbefore, consequently makes it possible to improve the contrast and resolution level of the reconstructed 3D image. In particular, in the case of medical imaging, the use of such an anisotropic model ensures a sufficiently precise reconstruction of the 3D image to enable the doctor to detect on said image an abnormality of an organ, even when the organ in question is of a complex nature, e.g. the vascular tree.

This process of reconstructing a three-dimensional image of an object according to the invention can e.g. be used for producing a cartography of the attenuation of rays by an object. In this case, the production of the attenuation cartography consists of making transmission measurement acquisitions of the object and then deducing therefrom projections of the attenuation using conventional processes, such as a logarithmic transformation of the ratio with an object-free transmission acquisition, a uniformity correction, etc. It then consists of reconstructing an attenuation map by means of an algebraic reconstruction process, associated with the anisotropic model according to the invention.

As in the prior art, for carrying out the transmission measurement acquisitions, it is possible to use a 3D tomographic system equipped with a X-radiation source, a detector and the object to be studied, which is positioned between the source and the detector. It is also possible to use an acquisition chain, i.e. a system having several radiation sources and several detectors, each source being associated with a detector.

In the case of producing a cartography or mapping for medical imaging, the studied object is the patient or an organ of said patient.

In the case of vascular attenuation imaging, the acquisitions take place before and during the injection of the contrast medium. The prior processing of the acquisitions inter alia comprises a logarithmic subtraction of the acquisitions before and during injection of the contrast medium for the same position of the radiation source and the detector.

In vascular attenuation imaging, the process according to the invention makes it possible to enhance the edges of the vessels, improve the contrast of the small vessels and eliminate certain defects due to a limited number of projections. The thus obtained map is then sufficiently legible to enable a doctor to determine the pathologies of his patient on the basis of said map.

For information purposes in such a case, it is possible to obtain a map with an adequate resolution and contrast after five iterations of the process.

Therefore the process according to the invention has the advantage of improving the contrast and resolution qualities of the reconstructed images both in cases where the acquisition conditions are difficult (number of attenuation measurements limited, unstable geometry) and in so-called normal acquisition cases, i.e. when the geometry is relatively stable and the number of transmission measurements is correct.

Thus, the process according to the invention makes it possible to have much less onerous constraints with respect to the acquisition device than in the conventional processes, i.e. a less rigid acquisition geometry, a slower rotation speed, etc., in order to obtain a cartography quality which is at least as good as that obtained in conventional processes where onerous constraints existed (large number of projections, rigid geometry, fast rotation speed, etc.). For an at least as good a cartography or mapping quality, the process of the invention consequently leads to a less expensive cartography or mapping procedure.

We claim:

1. Process for the reconstruction of a three-dimensional image of an object (I3D), defined by values assumed by a property of the object (1) in an array of elementary volumes of the 3D image of the object, consisting of:

determining on the basis of measurement acquisitions, by prior processing, measured projections (PM) of the property corresponding to measurements of sums of said property in accordance with lines localized by a bidimensional array associated with detection means (5), each acquisition being performed for a particular orientation of the detection means with respect to the object;

reconstructing the 3D image of the object by iteration;

characterized in that said reconstruction of the 3D image of the object consists:

a) on the basis of the measured projections, carrying out a reconstruction of a first 3D image of the object;

b) estimating, for each elementary volume, local parameters defining an anisotropic model (ML) using a direction of least variation of the property, as a function of said reconstructed 3D image;

and for all the elementary volumes and all the measured projections:

c) on the basis of the reconstructed 3D image, deducing calculated projections (PC) of the property passing through at least one previously chosen elementary volume;

d) comparing (E1) at least one calculated projection with the measured projection corresponding to the same elementary volume in order to deduce therefrom a projection difference;

e) determining, for each elementary volume, a weighting factor as a function of the parameters of the anisotropic model, and values of the property on neighbouring elementary volumes of said chosen elementary volume; and f) carrying out an updating (E2) of each elementary volume, elementary volume by elementary volume, on the basis of the projection difference and a mean weighted by the weighting factor of the value of the property of the elementary volumes adjacent to the chosen elementary volume, in order to obtain a new 3D image of the object; then g) reiterating at least stages c) to f), taking as the reconstructed image the new 3D image, until the desired 3D image of the object is obtained.

2. Process for the reconstruction of a three-dimensional image according to claim 1, characterized in that it consists, for each reiteration, reestimating for each elementary volume, the local parameters defining a new anisotropic model as a function of the last updating of the reconstructed 3D image of the property.

3. Process for the reconstruction of a three-dimensional image according to claim 1, consisting of performing a smoothing in the direction of the anisotropic model, as a function of weighting factors determined in stage e).

4. Process for the reconstruction of a three-dimensional image according to claim 3, characterized in that it also consists of performing one or more averaging operations respectively in one or two directions transverse to the principal direction of the local model.

5. Process for the reconstruction of a three-dimensional image according to claim 1, wherein the property of the object is the attenuation of the rays emitted by at least one radiation source towards at least one detection means associated with said radiation source, through said object, said source being able to assume several positions relative to the object and wherein the 3D image obtained is an attenuation cartography, characterized in that it firstly consists, for each position of the source, effecting a object and on the basis of which a real projection of the attenuation is determined.

* * * * *